April 1, 1958  J. W. YEE ET AL  2,829,241
AUTOMOTIVE VEHICLE LAMP

Filed Jan. 19, 1954  2 Sheets-Sheet 1

INVENTORS
John W. Yee &
Donald D. Hoagg
BY
ATTORNEY

April 1, 1958  J. W. YEE ET AL  2,829,241
AUTOMOTIVE VEHICLE LAMP
Filed Jan. 19, 1954  2 Sheets-Sheet 2
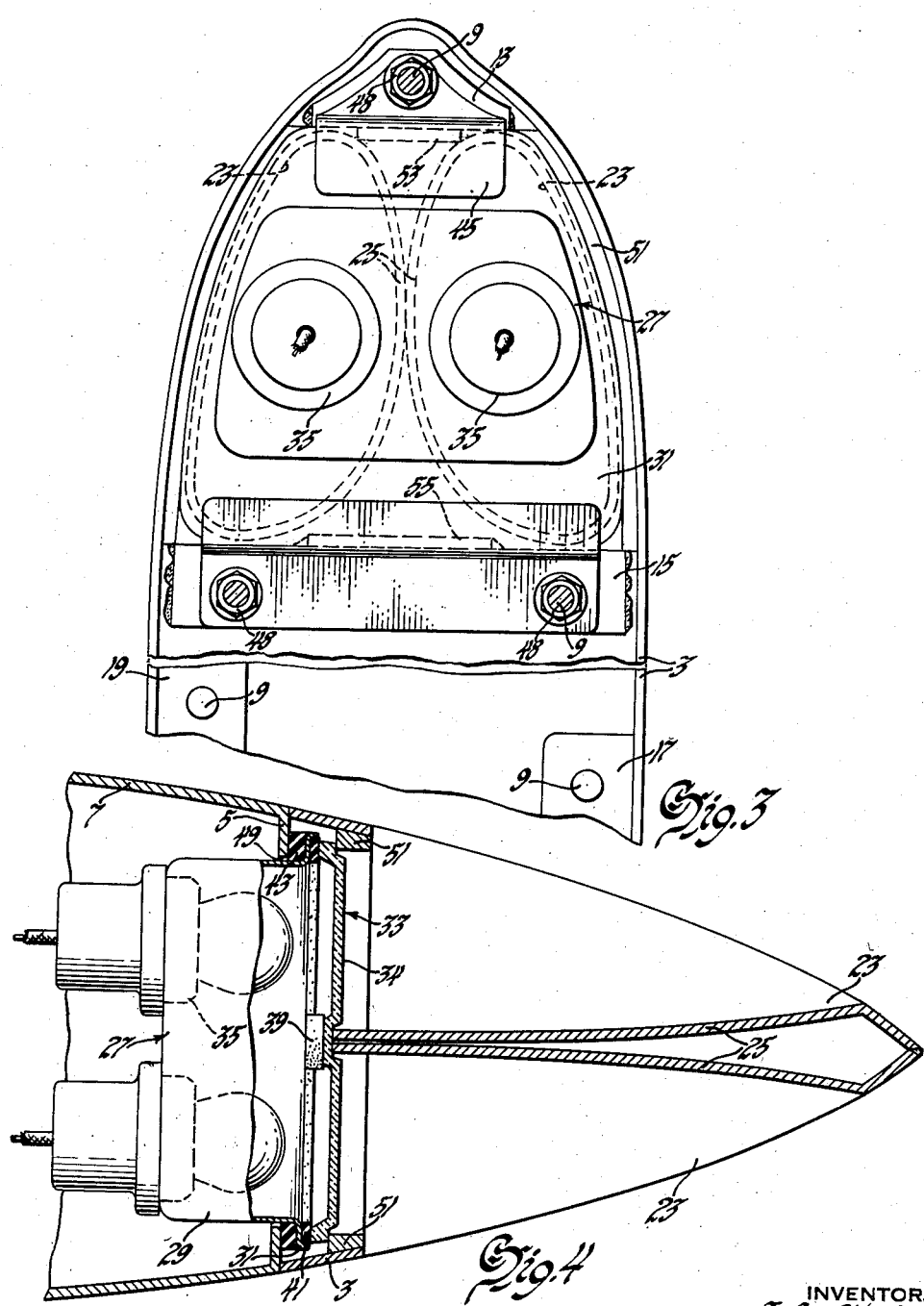
INVENTORS
John W. Yee &
BY Donald D. Hoagg
ATTORNEY

United States Patent Office 2,829,241
Patented Apr. 1, 1958

2,829,241

AUTOMOTIVE VEHICLE LAMP

John W. Yee, Roseville, and Donald D. Hoagg, Birmingham, Mich., assignors to General Motors Corporation, Detroit, Mich., a corporation of Delaware Application January 19, 1954, Serial No. 404,870

7 Claims. (Cl. 240—8.1)

This invention relates to an automotive vehicle lamp and more particularly to the combination of a lamp with the vehicle bumper.

The present trend in automotive vehicle design to sports models and sharply streamlined configurations has made it desirable to recess the lamps within the contour of the body in order to preserve the desired profile of the body. As used herein, the phrase contour of the body is intended to designate the general line of the body as formed by the body panels, bumpers, and trim elements. Likewise, this styling trend has also indicated the desirability of eliminating the bumper members which conventionally extend across the full width of the vehicle and tend to disrupt the smooth lines of the body contour. In its place, it has been proposed to substitute an abbreviated form of bumper adapted to form an extension of the fender and to generally blend in with its contours. Since the vehicle lamps are frequently positioned on the body in the front and rear fender portions, it has become necessary to mount the lamps in the bumpers.

One of the problems associated with this type of vehicle construction is to so mount the lamp in recessed position in the body, as to enable it to function as intended and as required by the State Committees administering motor vehicle safety. A further problem is to so mount the lamp as to minimize the effects of jarring and impact.

It is therefore an object of our invention to provide a vehicle lamp recessed in the bumper and visible from positions at the side as well as those directly to the front. It is a further object of our invention to provide a streamline body construction wherein the lamp equipment is so mounted within the bumper as to be substantially isolated from shock and vibration.

To attain these objects, we provide an abbreviated bumper adapted to be secured on the terminal face of the fender and being provided with at least one aperture having a side wall which acts as a side reflector for the lamp. The lamp unit is positioned in the terminal face of the fender so as to project its light rays out through the apertures, a plurality of resilient members being used to take up any shock and vibration to which it might be subjected.

Further objects and advantages of the present invention will be apparent from the following description, reference being had to the accompanying drawings wherein a preferred form of the present invention is clearly shown.

In the drawings:

Figure 3 is a rear elevational view with parts broken away taken on line 3—3 of Figure 2;

Figure 4 is a sectional view with parts broken away taken on line 4—4 of Figure 2.

Figure 1:
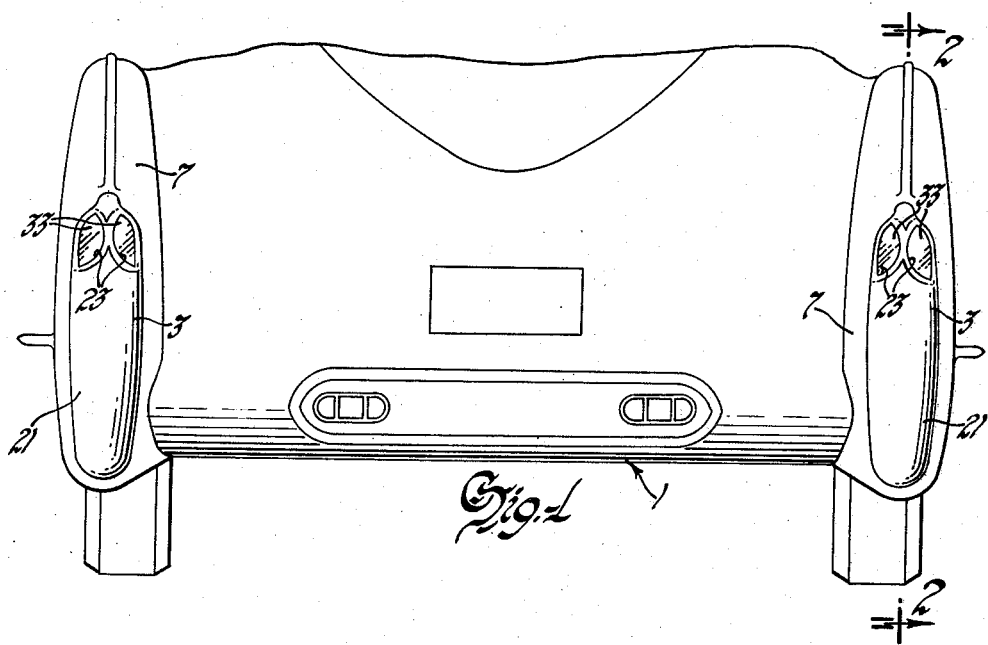
Figure 1 is a view in elevation of the rear end of an automotive vehicle embodying the features of our invention.
Figure 2:
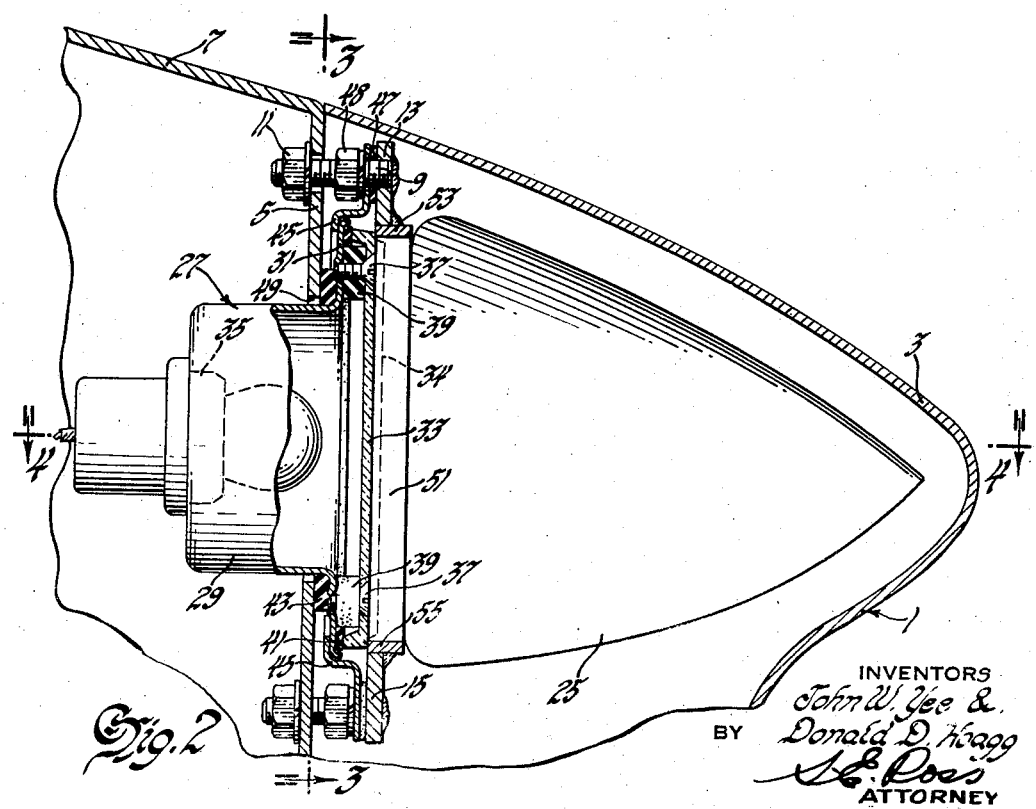
Figure 2 is a vertical sectional view with parts broken away taken on line 2—2 of Figure 1.

Referring now to the drawings and more particularly to Figure 1, there is shown the rear end 1 of a sharply streamlined automotive vehicle embodying the features of our invention. As used in the specification and claims, by streamline we intend to include not only those vehicles having streamlined contours in the aero-dynamic sense but also those having the generally long, unbroken, curved lines of symmetry typified by the sport car body styling. In order to trim up the body in accordance with the general plan of styling, the conventional bumper extending transversely across the rear end has been replaced by the abbreviated form of bumper 3 constructed in accordance with our invention and adapted to be mounted directly on the terminal face 5 of the fender 7 on either the right or left side of the vehicle. This form of bumper constitutes an extension of the fender 7 and generally blends in with its contour. As shown in Figures 2 and 3, the bumper 3 is removably secured to the terminal face 5 of fender 7 by means of a plurality of stud bolts 9 and nuts 11. The bolts 9 are secured, as by welding, to a plurality of bracket plates 13, 15, 17 and 19 spaced apart in the top portion and around the inside surface of bumper 3. The brackets are secured to the bumper in any suitable manner and extend inwardly therefrom in a plane substantially parallel with and adjacent to the fender face 5.

The bumper 3 is elongated in the vertical direction, narrow in the horizontal direction and has a generally hollow shell construction, being closed on all sides with the exception of the rear side thus permitting the bumper side walls to be engaged edgewise with fender 7 and smoothly blend in with its contour. The bumper 3 may be formed of separate elements secured together, as by welding, or may be integrally formed as by stamping or forging from the same metal stock. In either case, their front portions form a symmetrically curved front or shock wall 21.

The top portion of the bumper 3 is outwardly bulged and is provided with a pair of generally oval-shaped apertures 23, one each side of the center line, extending inwardly from front to rear thereof. A pair of generally C-shaped partitions 25 extend from front to rear of the bumper and form the inner walls of and serve to separate the apertures 23. The partitions 25 and apertures 23 are provided for tail lighting purposes as will be more fully described hereinafter.

A stop and tail signal lamp 27, shown in Figures 2, 3 and 4, is secured to the bumper 3 on its rearmost portion. The lamp 27 comprises a generally rhomboidal, cup-shaped casing 29 having a radially extending flange 31 formed on its front edge. A lens 33 formed of glass or plastic and tinted as desired is mounted on the flange 31. A pair of generally oval-shaped raised portions 34 are formed on the face of lens 33 to correspond to the shape of apertures 23 as is described more fully hereinafter. A pair of bulb and socket assemblies 35 are provided within the casing 29, the assemblies being positioned substantially centrally behind the raised lens portions 34. The assemblies 35 are supplied with power in the usual manner and function in the specific example shown on the drawings as the tail and stop lights of the vehicle.

Since the lamp 27 is secured to the bumper 3, special measures have to be taken to so mount the lamp in the bumper as to prevent undue vibration under shocks encountered under normal operating conditions and at the same time obtain a secure attachment between the lamp and the bumper to prevent relative movement therebetween. As shown in Figures 2, 3 and 4 the lens 33 is secured on flange 31 by means of a pair of screws 37 passing through the lens and having threaded attachment with the flange. A tubular resilient spacer member, sleeve 39, formed of rubber or rubber-like material is positioned about the screws 37 with its ends in abutment with the inner surface of lens 33 and the outer surface of flange 31. A sealing gasket 41 formed of any suitable resilient material is positioned between the lens 33 and the flange 31. It is thus seen that the gasket 41 and the sleeve members 39 serve to cushion the lens 33 from breakage caused by shock transmitted to the lens. Likewise, a resilient gasket 43 is secured on the rear surface of the flange 31 and adjacent the casing 29 in order to cushion the lamp casing on the fender face 5 which is provided with an aperture 49 to clear the lamp casing.

As shown in Figures 2 and 4, lamp 27 is adapted to be detachably secured to the bumper 3 with the oval-shaped raised lens portions 34 positioned within the apertures 23. The attachment is made by securing, as by welding, a pair of mounting brackets 45 to the upper and lower rear surfaces of the flange 31. The brackets 45 are drilled to permit the lamp 27 to be mounted on bolts 9 secured to bracket plates 13 and 15. A resilient washer 47 is positioned on each stud bolt 9 between the bracket plates 13 and 15 and the mounting brackets 45. In this manner, the lamp 27 may be secured on the bumper in a shock isolated manner, nuts 48 acting to draw the lamp tightly against the mounting plates 13 and 15.

In order to trim off the inner end of apertures 23, a C-shaped shoulder member 51 is secured to the inner surface of bumper 3 adjacent the rear edge of each aperture. The members 51 are positioned in the vertical plane and abut with and match the ends of the C-shaped partitions 25 to form a finished wall in each aperture. The rear end surfaces of the members 51 and the walls 25 lie in the same vertical plane and thus abut the surface of the lens 33 about its raised portions 34 to define separate lenses in each aperture. An upper and lower clamp bar 53 and 55 is secured, as by welding, to the upper and lower bracket plates 13 and 15, respectively, the bars 53 and 55 being so positioned and dimensioned as to locate their rear ends in the same plane as that of the rear ends of the partitions 25 and the members 51. In this manner, the lamp 27 is secured to the bumper 3 with the end surfaces of partitions 25, members 51 and clamp bars 53 and 55 in direct and solid abutment with the lens 33 thus providing a firm base and precluding any relative movement between the lamp and the bumper.

In assembling the lamp 27 to the bumper 3 the lamp is positioned on the bolts 9 secured to the mounting plates 13 and 15 with resilient washers 47 interposed therebetween. The nuts 48 are then threaded on the bolts 9 and the lamp 27 is drawn tightly against the bumper with the end surfaces of the aperture-defining partitions 25 and members 51 in direct abutment with the surface of the lens 33. The bumper 3 is then secured on the end surface 5 of fender 7 by means of the bolts 9 and corresponding nuts 11. The outer surfaces of the partition members 25 are highly polished and plated with bright metal in order that they may serve as reflector surfaces for obtaining side lighting of the rear end of the vehicle in the absence of any lens portion projecting beyond the body line.

It is thus seen from the above description that we have provided a tail light and bumper assembly which is adapted for use on highly stylized vehicles and is capable of producing the desired illumination characteristics without disrupting the streamline contours. It should also be noted that the assembly of the lamp within the bumper and the fender is such as to substantially isolate vibration effects and preclude relative movement between the lamp and the bumper.

While we have described the invention as applied to the rear portion of the vehicle, it should be understood that the principles are equally applicable to the front end. Likewise, one or more lamp apertures may be formed in the bumper. Though the form of embodiment of the invention as herein disclosed, constitutues a preferred form, it is to be understood that other forms may be adapted as may come within the scope of the claims which follow.

What is claimed is:

1. In a device of the class described, an elongated curved bumper adapted to be removably secured on a fender and having at least one aperture extending from front to rear on one side of the bumper centerline, mounting means secured to the inner surface of said bumper, at least one partition extending from front to rear of said bumper to form the inner wall of the aperture adjacent the bumper centerline, a lamp removably secured to said mounting means and positioned immediately behind said aperture, said lamp comprising a casing, a lens positioned on said casing, means securing said lens on said casing, a light source in said casing, means for securing said lamp to said mounting means, and a resilient member positioned between said mounting means and said last mentioned means, the outer wall surface of said partition in the aperture serving to provide side lighting for said vehicle.

2. In a streamline automotive vehicle, the combination of a fender, an elongated curved bumper removably secured on said fender, and having at least one aperture extending from front to rear on one side of the bumper centerline, mounting means secured to the inner surface of said bumper, at least one partition extending from front to rear of said bumper to form the inner wall of the aperture adjacent the bumper centerline, a lamp removably secured to said mounting means and positioned immediately behind said aperture, said lamp comprising a casing, a lens positioned on said casing, means securing said lens on said casing, a light source in said casing, a resilient sealing gasket positioned between said lens and said casing, means for securing said lamp to said mounting means, and a resilient member positioned between said mounting means and said last mentioned means, the outer wall surface of said partition in the aperture serving to provide side lighting for said vehicle.

3. In a device of the class described, an elongated curved bumper adapted to be removably secured on a fender and having at least one aperture extending from front to rear unsymmetrically located with respect to the bumper centerline, a plurality of mounting plates secured to the inner surface of said bumper, at least one partition extending from front to rear of said bumper to form the inner wall of the aperture adjacent the bumper centerline, at least one shoulder member secured to the inner surface of said bumper adjacent the rear edge of the aperture, the end of said partition abutting the end of said member to form a finished wall in the aperture, a lamp removably secured to said mounting plates in said top portion and positioned immediately behind said aperture, said lamp comprising a casing having a flange, a lens positioned on said flange, a screw in said lens having threaded attachment with said casing, a resilient spacer positioned adjacent said screws and in abutment with said casing and said lens, a light source in said casing, a resilient sealing gasket positioned between said lens and said flange, and means for resiliently securing said lamp to said plates to position the surface of said lens in abutment with the end surface of said wall, the outer wall surface of said partition in the aperture serving to provide side lighting for said vehicle.

4. In a device of the class described, an elongated curved bumper adapted to be removably secured on a fender and having an aperture extending from front to rear on one side of the bumper centerline, a plurality of mounting plates secured to the inner surface of said bumper, a partition adjacent the bumper centerline extending from front to rear of said bumper to form the inner wall of the aperture, a lamp removably secured to said mounting plates and positioned immediately behind said aperture, said lamp comprising a cup-shaped casing having a flange, a lens positioned on said flange, a screw in the upper and lower portions of said lens having threaded attachment with said flange, a resilient spacer positioned adjacent said screws and in abutment with said flange and said lens, a light source in said casing, a resilient sealing gasket positioned between said lens and said flange, and a pair of mounting brackets secured to the upper and lower portions of said flange, said brackets being resiliently secured to said plates to position the surface of said lens in abutment with the end surface of said wall, the outer wall surface of said partition in said aperture serving to provide side lighting for said vehicle.

5. In a streamline automotive vehicle, the combination of a fender, an elongated bumper removably secured on said fender and forming a continuance of the fender contour, said bumper having its top portion provided with a pair of apertures extending from front to rear, one each side of the center line, a plurality of mounting plates secured to the inner surface of said bumper, a pair of partitions extending from front to rear of said top portion to form the inner walls of the apertures, the rear end surface of each wall lying in a common plane, a lamp removably secured to said mounting plates in said top portion and positioned immediately behind said apertures, said lamp comprising a casing having a flange, a lens positioned on said flange, a screw in the upper and lower portions of said lens having threaded attachment with said flange, a resilient sleeve positioned about said screws and in abutment with said flange and said lens, a light source in said casing, a resilient sealing gasket positioned between said lens and said flange, a pair of mounting brackets secured to the upper and lower portions of said flange, said brackets being secured to said plates in said top portion to position the surface of said lamp in abutment with the rear end surfaces of said walls, and resilient washers positioned therebetween, the outer wall surface in each aperture serving to provide side lighting for said vehicle.

6. In a streamline automotive vehicle, the combination of a fender having a terminal face with an aperture formed therein, an elongated bumper removably secured on said face and forming a continuance of the contour of said fender, said bumper having its top portion outwardly bulged and provided with a pair of apertures extending from front to rear of said top portion, one each side of the center line, a plurality of mounting plates secured to the inner surface of said bumper, a pair of partitions extending from front to rear of said top portion to form the inner walls of the apertures, a pair of shoulder members secured to the inner surface of said top portion adjacent the rear edges of each aperture, the ends of said partitions abutting the ends of said members to form a finished wall in each aperture with the rear end surface of each wall lying in a common plane, a lamp removably secured to said mounting plates in said top portion and positioned immediately behind said apertures, said lamp comprising a cup-shaped casing having a flange formed on the front thereof, a lens positioned on said flange, a screw in the upper and lower portions of said lens having threaded attachment with said flange, a resilient spacer positioned adjacent said screws and in abutment with said flange and said lens, a pair of lighting assemblies in said casing positioned behind each aperture, a resilient sealing gasket positioned between said lens and said flange, a resilient gasket positioned on the rear of said flange about said casing for cushioning said casing on said face, a pair of mounting brackets secured to the upper and lower portions of said flange, said brackets being secured to said plates in said top portion to position the surface of said lens in abutment with the rear end surfaces of said walls, and resilient washers positioned between said plates and brackets, the outer surface of the partition in each aperture serving to provide side lighting for said vehicle.

7. In a streamline automotive vehicle, the combination of a rear fender having a terminal face with an aperture formed therein, an elongated bumper removably secured on said face and forming a continuance of the contour of said fender, said bumper having its top portion outwardly bulged and provided with a pair of oval-shaped apertures extending from front to rear of said top portion, one each side of the vertical centerline, a plurality of mounting plates secured to the inner surface of said bumper, a pair of generally C-shaped partitions extending from front to rear of said top portion to form the inner walls and separating partition of the apertures, a pair of generally C-shaped shoulder members secured to the inner surface of said top portion adjacent the rear edges of each aperture, the ends of said partitions abutting the ends of said members to form a finished wall in each aperture, the rear end surface of each wall lying in a common plane, a tail signal lamp removably secured to said mounting plates in said top portion and positioned immediately behind said apertures, said lamp comprising a cup-shaped casing having a flange formed on the front thereof, a lens positioned on said flange, a screw in the upper and lower portions of said lens having threaded attachment with said flange, a resilient sleeve positioned about said screws and in abutment with said flange and said lens, a pair of lighting assemblies in said casing positioned behind each aperture, a resilient sealing gasket positioned between said lens and said flange, a resilient gasket positioned on the rear of said flange about said casing for cushioning said casing on said face, a pair of mounting brackets secured to the upper and lower portions of said flange, said brackets being secured to said plates in said top portion to position the surface of said lens in abutment with the rear end surfaces of said walls, and resilient washers positioned therebetween, the outer surface of the partition in each aperture serving to provide side lighting for said vehicle.

References Cited in the file of this patent
UNITED STATES PATENTS

| | | |
|---|---|---|
| 1,793,730 | Barber | Feb. 24, 1931 |
| 2,025,952 | Levet | Dec. 31, 1935 |
| 2,533,212 | Balmer | Dec. 12, 1950 |
| 2,606,772 | Mead et al. | Aug. 12, 1952 |